United States Patent [19]
Chirnomas

[11] Patent Number: 5,240,139
[45] Date of Patent: Aug. 31, 1993

[54] PACKAGE VENDING MACHINE

[76] Inventor: Munroe Chirnomas, 336 Second St., Dunellen, N.J. 08812

[21] Appl. No.: 846,691

[22] Filed: Mar. 6, 1992

[51] Int. Cl.$^5$ .................................... G07F 11/00
[52] U.S. Cl. ..................... 221/2; 221/123; 221/150 R; 221/155; 221/197; 221/211; 221/262
[58] Field of Search ............. 414/797; 221/2, 4, 123, 221/150 R, 155, 197, 210, 211, 262, DIG. 1

[56] References Cited

U.S. PATENT DOCUMENTS

| | | | |
|---|---|---|---|
| 2,524,673 | 10/1950 | Martin | 221/150 R |
| 3,986,638 | 10/1976 | DeHart | 221/211 |
| 4,375,126 | 3/1983 | Dull et al. | 414/797 |
| 4,473,922 | 10/1984 | Weihe | 414/797 |
| 4,639,875 | 1/1987 | Abraham et al. | 221/2 |
| 4,677,278 | 6/1987 | Knoll | 221/150 R |
| 5,097,986 | 3/1992 | Domberg et al. | 221/155 |

FOREIGN PATENT DOCUMENTS 2455673  5/1976  Fed. Rep. of Germany ...... 221/211

*Primary Examiner*—H. Grant Skaggs
*Attorney, Agent, or Firm*—Morton Chirnomas

[57] ABSTRACT

The present invention relates to a vending apparatus for selectively dispensing one of a plurality of packages. The vending apparatus comprises:

a) an outer cabinet;
b) an isolated freezer compartment within the outer cabinet for storing the plurality of packages disposed within the outer cabinet, the freezer compartment having a thermal barrier for maintaining a frozen environment within the freezer compartment in isolation of the ambient temperature air filling the remaining interior space of the outer cabinet;
c) a mechanism for opening the thermal barrier;
d) a picker for selectively removing the selected package from the freezer compartment, the picker being located outside the freezer compartment in between operating cycles and entering the freezer compartment for removing one of the packages only during the removal operation; and
e) a controller for automatically controlling the picker and opening mechanism in response to a customer's selection.

24 Claims, 8 Drawing Sheets

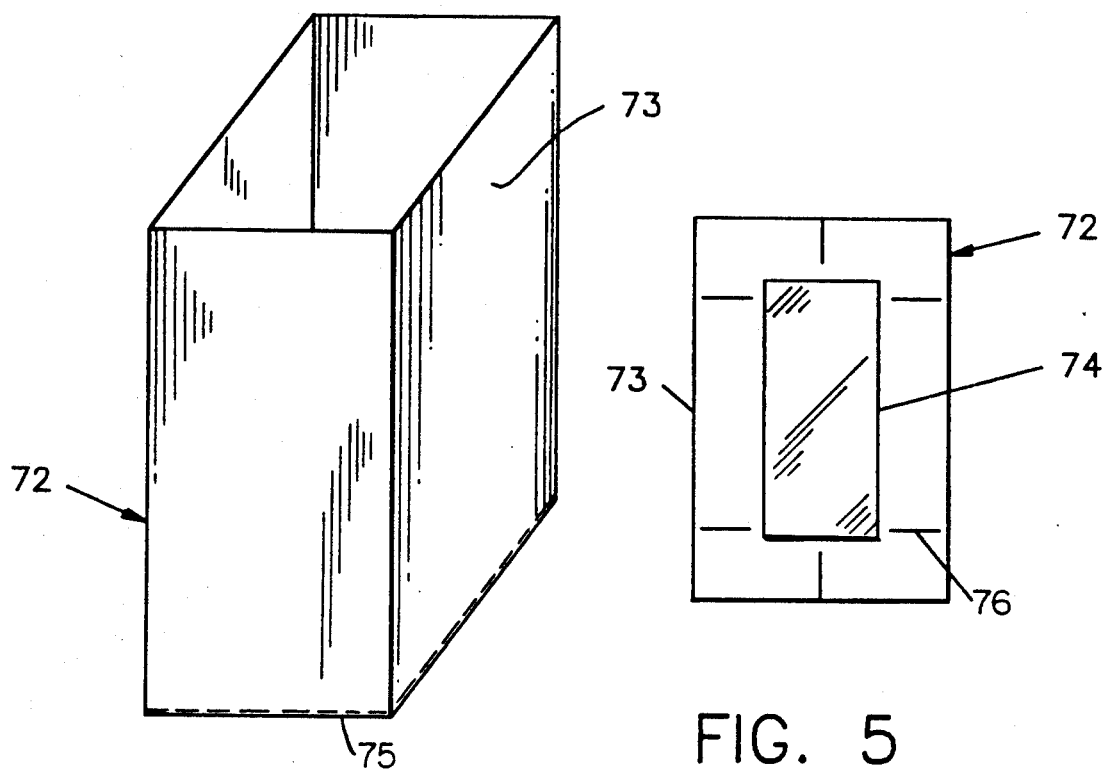
FIG. 4
FIG. 5
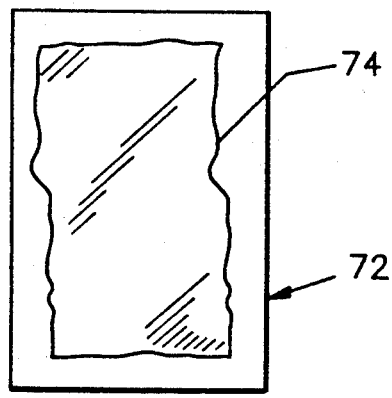
FIG. 6
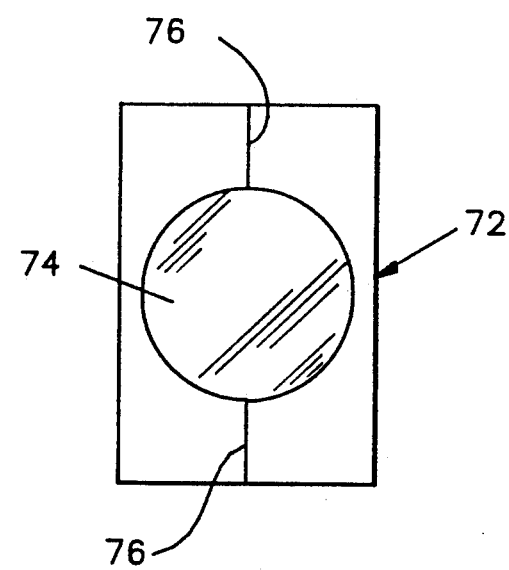
FIG. 7

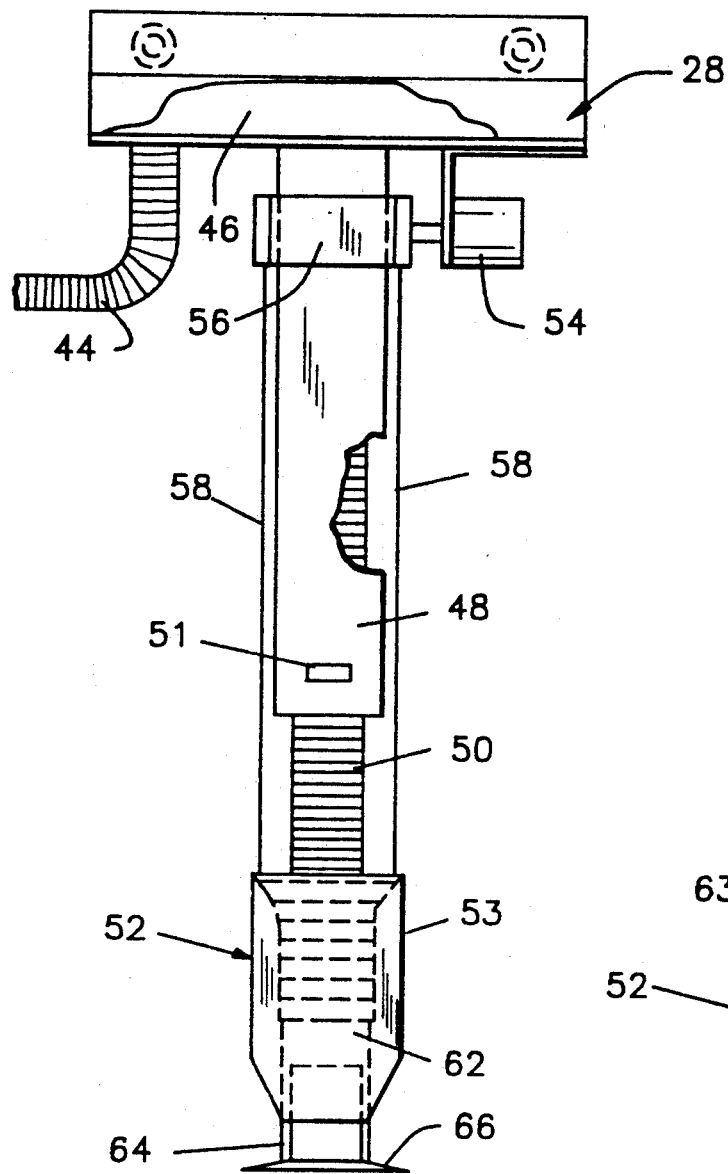
FIG. 8
FIG. 9
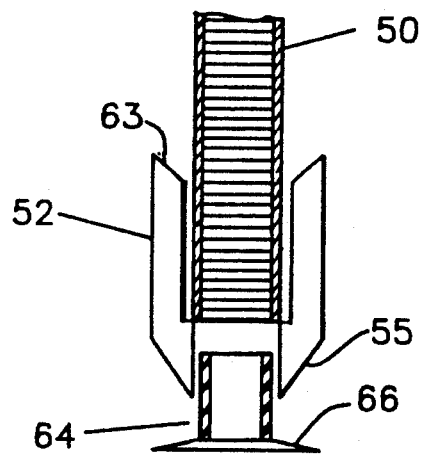
FIG. 10

PACKAGE VENDING MACHINE

FIELD OF THE INVENTION

The present invention relates to an apparatus for selectively dispensing a selected one of a plurality of packages. More particularly, the apparatus of the present invention utilizes a constant negative air pressure picker for picking up packages of frozen food having heterogeneous shapes and sizes from a thermally isolated storage compartment.

BACKGROUND OF THE INVENTION

Until recent years, most of the mechanisms used in various package and product dispensing machines relied on a multitude of motors, switches and solenoids for moving various machine parts and otherwise handling the package to be dispensed. Most such machines required one motor, switch and/or solenoid for each row, column or type of product or package dedicated to kicking out or otherwise ejecting the desired package or product therefrom. Therefore, a machine having an arrangement of nine racks of product would typically require nine motors, switches and/or solenoids for ejecting one product from each rack.

Such machines generally suffer from numerous disadvantages. One disadvantage lies in the fact that any machine having such an arrangement will commonly experience numerous mechanical failures due to such factors as age, exposure, poor maintenance, poor assembly, misalignment, etc. Furthermore, the tendency to malfunction can be greatly increased when the mechanical parts must operate in a frozen environment such as that created in a frozen food or ice cream vending machine.

Additionally, each motor, switch and/or solenoid can be expensive and therefore can contribute to increasing the overall cost of a machine, i.e., either in capital or assembly costs. Elimination of any such mechanical parts will usually result in a lowered cost of production and future maintenance and repair.

Moreover, extraneous machinery uses up valuable space which could be occupied by product. The loss of product storage space means that the machine location must be visited by the operator more frequently for restocking, thereby increasing operating costs and reducing profitability.

For the above reasons and others not expressly discussed herein, numerous attempts have been made to develop package and product dispensing machines which have as few motors, switches, solenoids and other mechanical devices as possible.

As one example of such a package and product dispensing machine, consider the apparatus disclosed in U.S. Pat. No. 4,787,533 to Haroutel et al. The dispenser disclosed by Haroutel et al. dispenses postal packets of differing sizes and types. The device utilizes individually controlled and motorized horizontal and vertical carriages for positioning a product holding device in font of the desired article. However, this device still has a relatively large number of electro-mechanical parts which are relatively intricate to assemble and expensive to operate and maintain. Furthermore, the disclosed mechanism is not designed for cold temperature operation and therefore is not suitable for cold food dispensing.

U.S. Pat. No. 5,025,950 to Trouteaud et al. discloses an apparatus for storing and dispensing ice cream packaged in uniform containers which are stored in rotatable transporters or revolving racks. However, this apparatus does not solve the above-mentioned problems. Firstly, each rotatable transporter requires its own motor drive. Secondly, this arrangement has a very limited capacity. Thirdly, and perhaps most importantly, all of the mechanics of the disclosed apparatus are exposed to the cold environment.

As was mentioned briefly above, mechanical failures are common with vending machines that refrigerate their products, especially with vending machines that employ motors or solenoids to dispense their products from the refrigerator. Because the motors and solenoids are located within the refrigerator, they are subjected to cold temperatures and condensates. Such harsh operating conditions increase the likelihood that the motors and solenoids will malfunction. The apparatus of Trouteaud et al. is as susceptible as the other prior art machines and furthermore suffers from the other disadvantages discussed hereinabove.

German Application No. 2,455,673 discloses a machine for vending frozen food packages which utilizes a motorized sliding carriage to position a suction device over the package to be dispensed. The entire suction device is then lowered by a motorized drum and cable system until contact is made between the suction device and the package. The suction device is then activated and withdrawn to a dispensing position along with the package. However, this device still suffers from the disadvantage that the entire mechanism is still subject to the cold environment of the freezer, thereby inviting increased mechanical failures as well as having the inefficiency of expending a good deal of energy cooling large volumes of non-storage space.

SUMMARY AND OBJECTS OF THE INVENTION

Therefore, it is one object of the present invention to provide an apparatus for dispensing products which are stored in a refrigerated or frozen condition having fewer moving parts than known apparatus.

It is another object of the present invention to provide an apparatus for dispensing frozen products in which cold-susceptible moving parts are exposed to the cold environment only during the dispensing process.

It is still another object of the present invention to provide an apparatus for dispensing frozen products wherein the storage capacity of the refrigerated area is much greater than that of known frozen food dispensers.

It is yet another object of the present invention to provide an apparatus for dispensing frozen products having heterogeneous shapes, weights and sizes.

The foregoing objectives an others not specifically enumerated herein are accomplished by the present invention which relates generally to a vending apparatus for selectively dispensing one of a plurality of packages. More particularly, the vending apparatus of the present invention is especially well-suited for dispensing frozen and refrigerated foods such as ice cream, for example. The vending apparatus comprises an outer cabinet having storing means for storing the plurality of packages disposed therein. The storing means is provided with a displaceable thermal barrier and refrigeration means for refrigerating the interior of the storing means to a selected temperature. The thermal barrier is displaceable by opening means provided for opening the thermal barrier.

The apparatus is provided with package removing means for selectively removing the selected package from the storing means. The removing means are located outside the storing means between operating cycles and enter the storing means only for the purpose of removing one of the packages during the dispensing operation. The dispensing operation is governed by controlling means for automatically controlling the package removing means and opening means in response to a customer's selection, as well as maintaining an inventory map and sensing operating conditions.

The removing means includes a picker for contacting the package to be removed, x-y positioning means for positioning said picker over the package, and z positioning means for selectively raising and lowering the picker above the package. The lifting is accomplished by constant air blower means for creating a constant negative air pressure which is connected to the picker by an air hose. The air blower means and z positioning means are controlled by the controlling means which sequentially actuates them in response to signals sent by sensing means on the picker for sensing contact between the picker and the package. The package is then lifted up and deposited into a dispensing area, by which time the thermal barrier has been replaced, thereby conserving the cold environment of the storage area and protecting the apparatus' cold-susceptible moving and electromechanical parts.

BRIEF DESCRIPTION OF THE DRAWINGS

For a more complete understanding of the present invention, reference may be had to the following detailed description of an exemplary embodiment taken in conjunction with the accompanying figures of the drawings, in which:

FIG. 4 is a perspective view of a cartridge to be utilized with one embodiment of a vending apparatus constructed in accordance with the present invention;

FIG. 5 is a top plan view of a cartridge to be utilized with one embodiment of a vending apparatus constructed in accordance with the present invention according to FIG. 4;

FIG. 6 is a top plan view of another cartridge to be utilized with one embodiment of a vending apparatus constructed in accordance with the present invention according to FIG. 4;

FIG. 7 is a top plan view of another cartridge to be utilized with one embodiment of a vending apparatus constructed in accordance with the present invention according to FIG. 4;

FIG. 8 is a perspective view in detail of a portion of a vending apparatus for selectively dispensing one of a plurality of packages in accordance with FIG. 1, a portion thereof being shown in partial cross-section;

FIG. 9 is a bottom plan view in detail of a portion of a vending apparatus for selectively dispensing one of a plurality of packages in accordance with FIG. 8;

FIG. 10 is a cross-sectional view in detail of a portion of a vending apparatus for selectively dispensing one of a plurality of packages in accordance with FIG. 1;

DETAILED DESCRIPTION OF THE EXEMPLARY EMBODIMENTS

Figure 1:
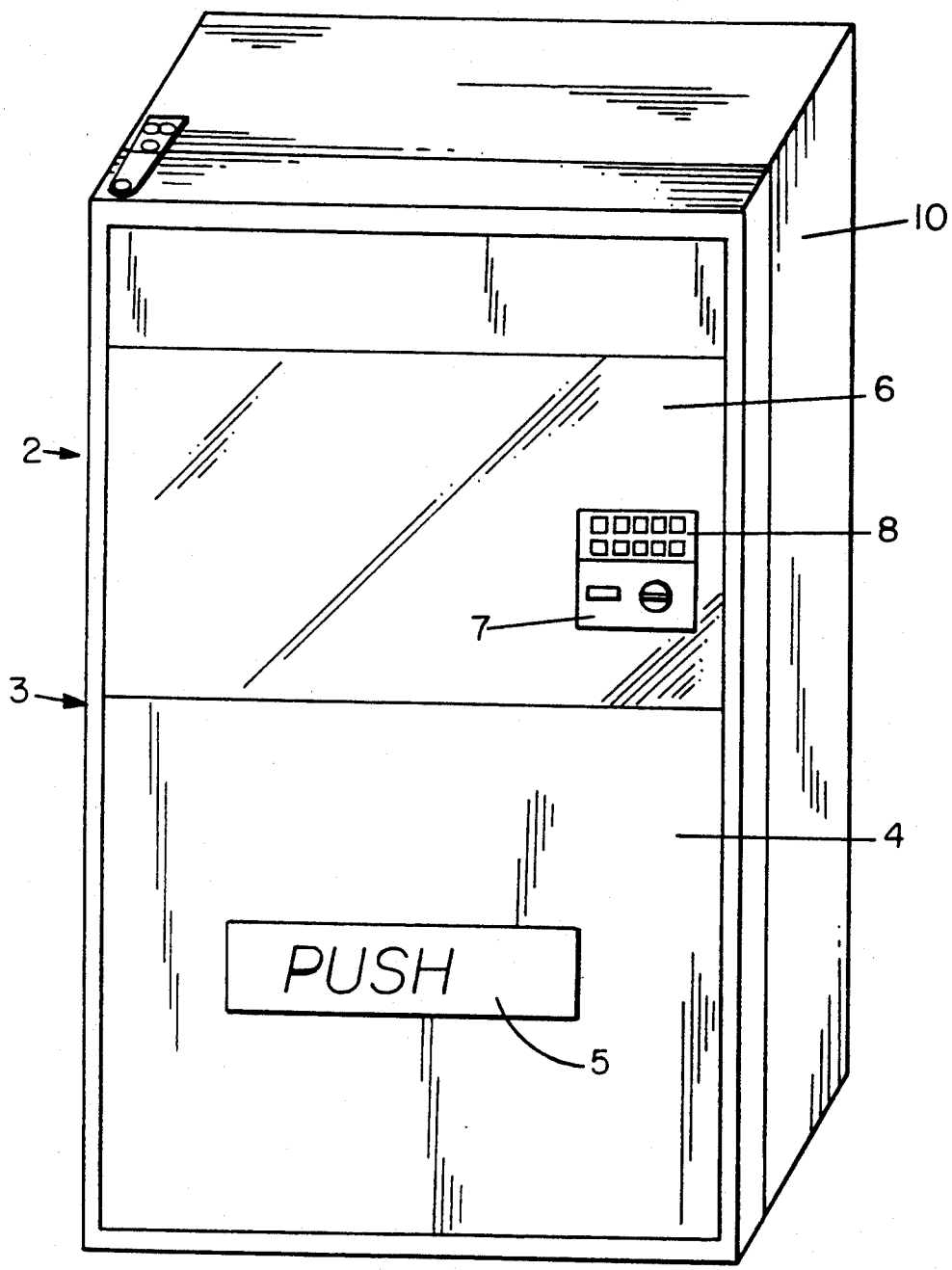
FIG. 1 is a perspective view of one embodiment of a vending apparatus for selectively dispensing one of a plurality of packages in accordance with the present invention.
Figure 2:
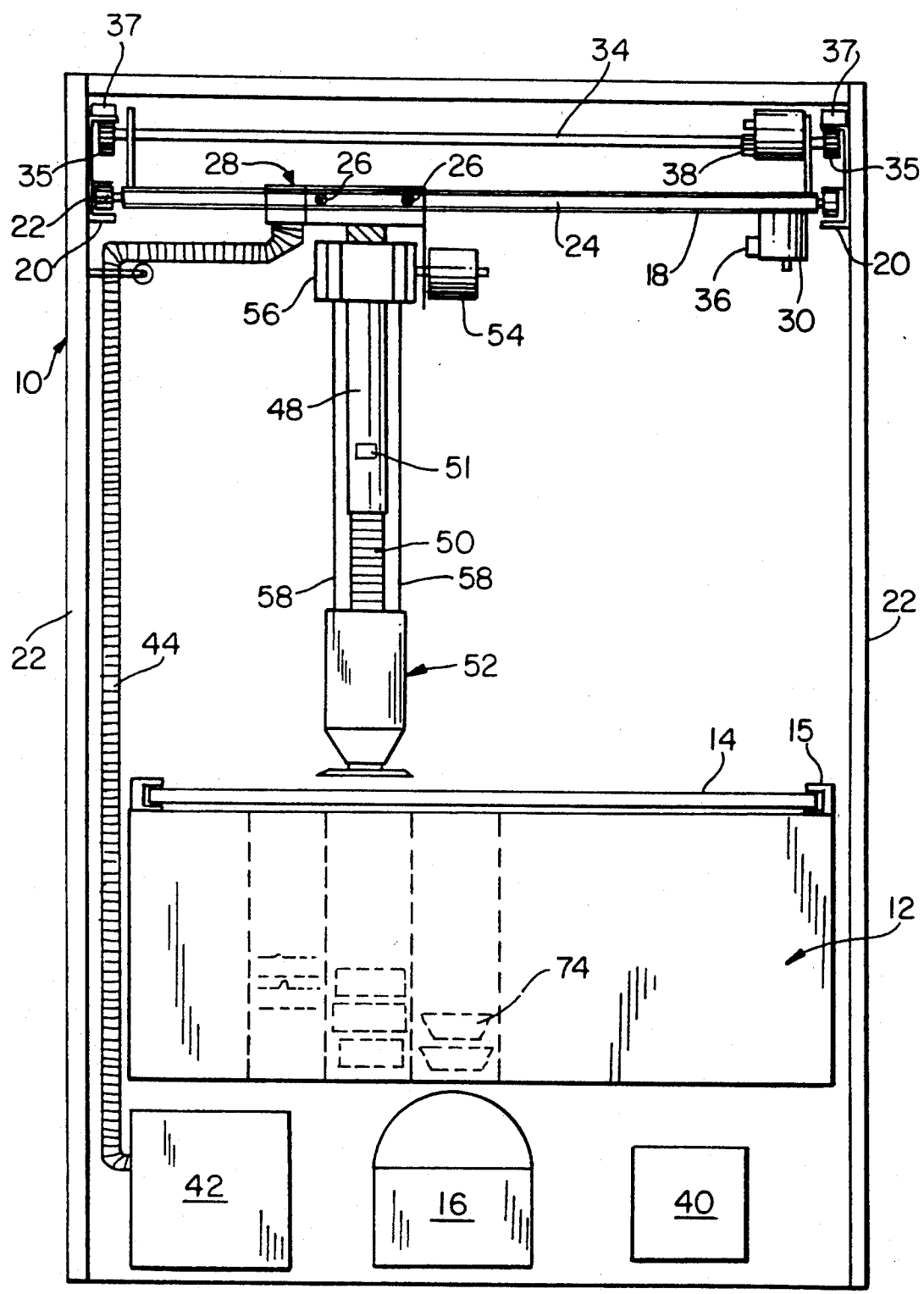
FIG. 2 is a front elevational view of one embodiment of a vending apparatus for selectively dispensing one of a plurality of packages in accordance with FIG. 1, having the front door removed.
Figure 3:
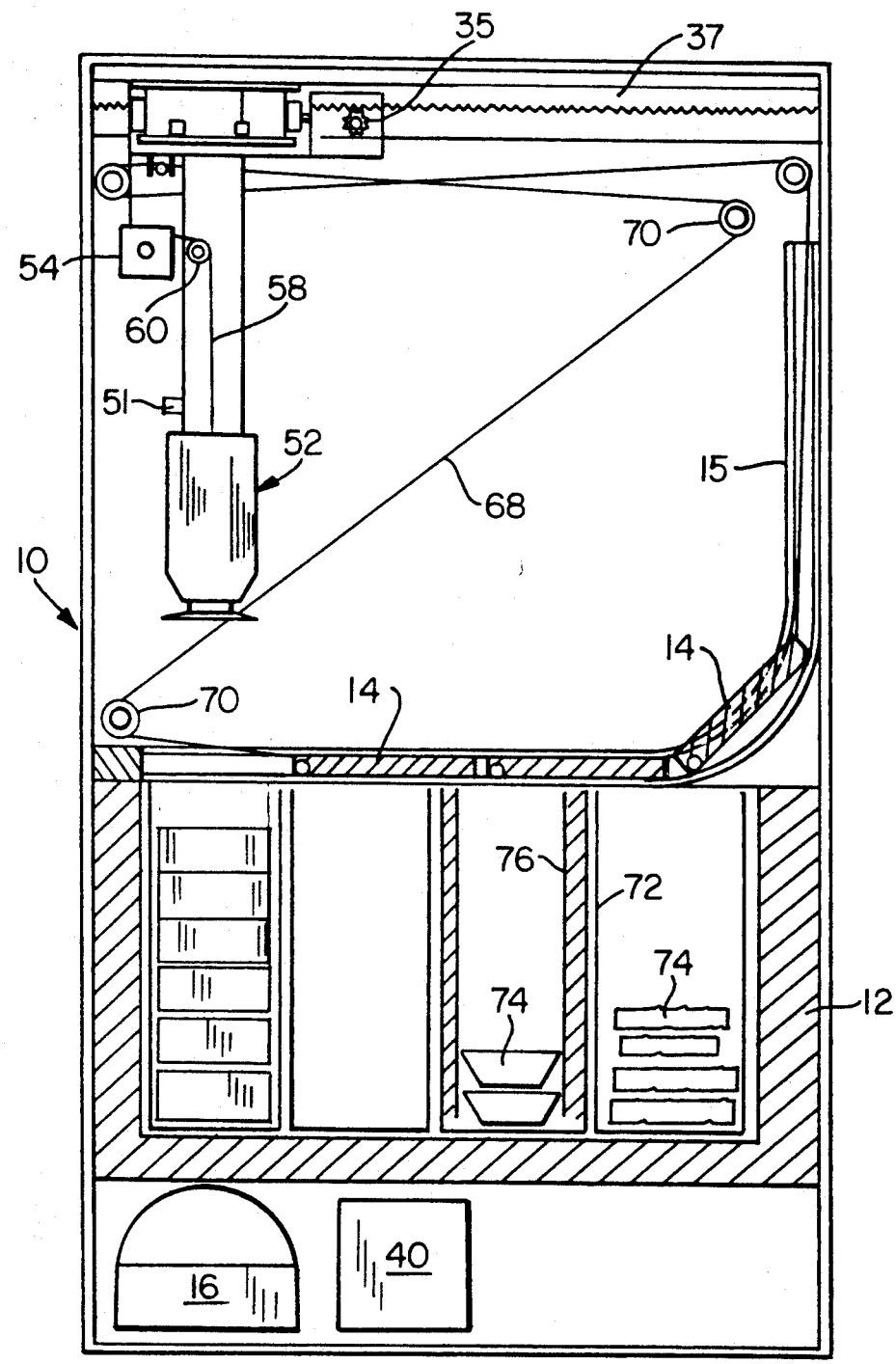
FIG. 3 is a left-side elevational view of one embodiment of a vending apparatus for selectively dispensing one of a plurality of packages in accordance with FIG. 1, having the left wall of the outer cabinet removed and shown in partial cross-section for purposes of clarity and discussion.
Figure 11:
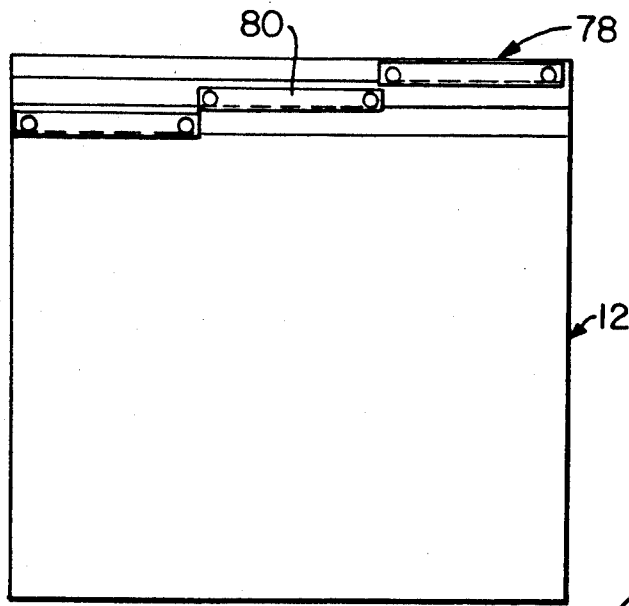
FIG. 11 is a side elevational view in detail of a portion of a vending apparatus for selectively dispensing one of a plurality of packages in accordance with FIG. 1.

With reference to FIGS. 1-3, there is shown a vending machine 2 having an outer housing 3 with a main door 4. A customer retrieval door 5 is disposed in a lower part of door 4 while the upper part is dominated by a viewing glass 6. Inset near viewing glass 6 there is a currency receiver 7 and labelled selection switches 8.

Referring now more particularly to FIGS. 2 and 3 machine cabinet 10 is shown having a freezer compartment 12 disposed in a bottom portion thereof. Freezer compartment 12 has an open top which is covered by sliding panels 14, positioned in sliding door tracks 15, which provides a thermal barrier for maintaining a cooled environment between 0° and −20° F. in freezer compartment 12. The cooled environment is provided by refrigeration system 16 located in a bottom portion of machine cabinet 10.

An x-y beam 18 is suspended above sliding panels 14 and outside freezer compartment 12 between y rails 20 which are attached opposite one another near the top of cabinet sides 22. Beam 18 has ball-bearing rollers 22 which rest on y rails 20 at either end thereof. There are x-guide rails 24 provided on either long edge of x-y beam 18 on which ride additional ball-bearing rollers 26 which are attached to x-y carriage 28. The side to side movement of x-y carriage 28 is accomplished by X motor 30 which is suspended in a stationary position on the underside of x-y beam 18. X-y carriage 28 and X motor 30 may be connected in a variety of ways such as by an endless chain which engages toothed sprockets (not shown) provided on both x-y carriage 28 and X motor 30. Movement of x-y beam 18 is similarly accomplished by providing Y motor 32 for driving Y axle 34. Y axle 34 has one gear 35 at each end thereof, enmeshed with toothed rack 37. The positions of x-y carriage 28 and x-y beam 18 are determined by X position sensor 36 and Y position sensor 38, respectively, which feed distance measurements to an automatic control system 40 located adjacent to freezer compartment 12 which governs and coordinates all the operations of the present invention. The preceding arrangement for positioning the x-y carriage 28 over the correct dispensable product may be referred to collectively as the x-y positioning means.

A blower motor 42 is housed between machine cabinet 10 and freezer compartment 12. Blower motor 42 has connected thereto a flexible air hose 44, which air hose 44 is connected at its other end to x-y carriage 28 which comprises an air conduit 46. X-y carriage 28 has a picker guide tube 48 extending down therefrom which houses a longitudinally-compressible hose 50. Picker guide tube 48 has mounted on an outer surface thereof a z-origin sensor 51 for a purpose which will be more fully discussed hereinbelow.

Hose 50 connects at its upper end with air conduit 46 and has a picker head 52 at its lower terminus. Picker head 52 comprises a counterweight against sudden closed-end vacuum pressure and has a generally cylindrical upper portion 53 with a frustum-shaped lower end 55 for a reason which will be disclosed hereinbelow. A Z motor 54 mounted to x-y carriage 28 is attached to a Z reel 56 which has wrapped thereon two Z cables 58. Cables 58 are wound around Z reel 56 which is rotated by Z motor 54, and then pass over centering Z pulleys 60 which align cables 58 so they are equidistant from one another and parallel with the longitudinal axis of guide tube 48. Cables 58 are attached to the top of picker head 52.

Referring now to FIGS. 8-10, picker head 52 has a central bore 62 therethrough. Bore 62 tapers from a wide diameter interior conical guide 63 near the top of picker head 52 to a diameter slightly greater than that of hose 50. Hose 50 is secured to the inside of bore 62 by any of a number of suitable means including clamping, friction, screw threads or glue. In the terminal end of picker head 52 and circumscribing the mouth of bore 62, there is installed a package sensor ring 64. Attached to the outer portion of sensor ring 64 there is a flexible circular rubber gasket 66 which provides for greater conformance to package contours during the operation of the present invention.

Referring now back to FIGS. 2 and 3, x-y carriage 28 is securely fixed to sliding panel cables 68 which are closed-loop cables. Cables 68 pass around a series of sliding door pulleys 70 and are securely fixed to sliding panels 14. Cables 68 are arranged together with pulleys 70 so that sliding panels 14 slide from a closed position back and up tracks 15 when x-y carriage 28 is moved towards the rear of cabinet 10. When x-y carriage 28 is moved back towards a starting position near the front of cabinet 10, sliding panels 14 is similarly moved back into a closed position.

Referring now to FIGS. 4-7, there is shown one embodiment of a cartridge 72 which may be used in conjunction with the present invention. Cartridge 72 has generally rectangular walls 73 and a floor 75 with one open end into which frozen food packages 74 are placed. With particular reference to FIGS. 5 and 7, packages 74 of different sizes can be held centered in a standard size cartridge 72 by using package positioners 76, which may be locked into place or removably inserted into receiving means (not shown) in cartridge 72. The use of cartridges 72 for holding packages 74 provides numerous advantages such as enabling easy preloading at a central location in an assembly line fashion, quicker restocking, and proper positioning of packages 74 having many shapes and sizes in the same basic outer unit.

Figure 12:
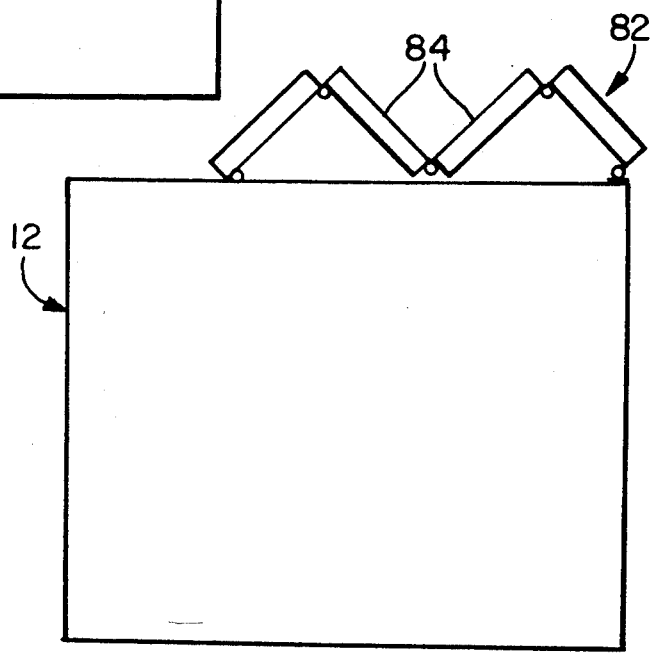
FIG. 12 is a side elevational view in detail of another embodiment of a portion of a vending apparatus for selectively dispensing one of a plurality of packages in accordance with FIG. 1.
Figure 13:
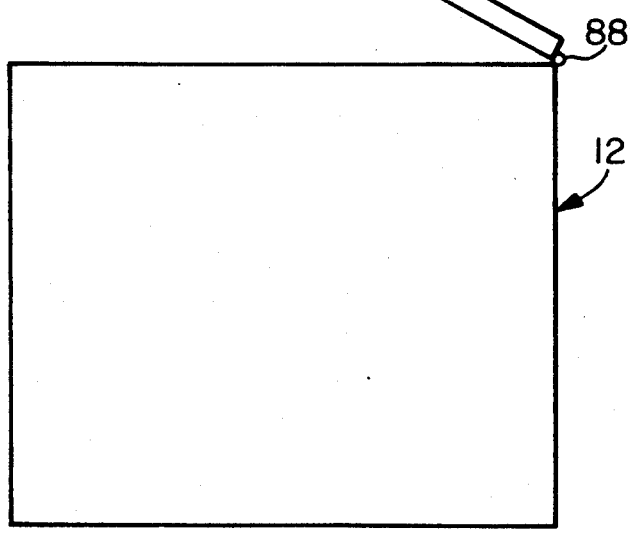
FIG. 13 is a side elevational view in detail of another embodiment of a portion of a vending apparatus for selectively dispensing one of a plurality of packages in accordance with FIG. 1.
Figure 14:
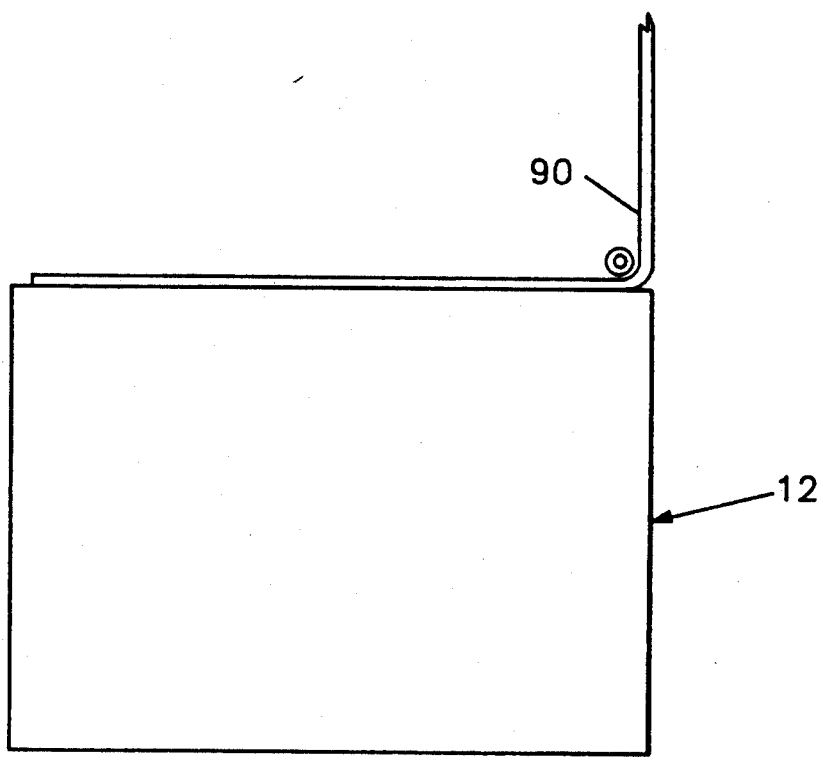
FIG. 14 is a side elevational view in detail of another embodiment of a portion of a vending apparatus for selectively dispensing one of a plurality of packages in accordance with FIG. 1.

Referring to FIGS. 11-14, there are shown alternate embodiments for covering the open top of freezer compartment 12. One embodiment seen in FIG. 11 has a multi-part cover 78 constructed with numerous panel members 80 which slide over or under adjacent members 80. The cover 82 of FIG. 12 is constructed of a plurality of hinged members 84 so that the members 84 fold up against one another. The cover 86 of FIG. 13 is a single unit which is connected by at least one hinge 88 to freezer compartment 12. In this embodiment, the cover 86 opens in a vertically arcing motion. The cover 90 of FIG. 14 is a single flexible member which slides in track 15.

In use, a customer inserts money into currency receiver 7 and makes a selection from selection switches 8. Automatic control system 40 locates the correct stack of packages and activates X motor 30 to move x-y carriage 28 left or right to a position in line with the stack. When x-y carriage 28 reaches the correct position, X motor 30 is turned off and Y motor 32 which moves the entire x-y beam 18 carrying the x-y carriage 28 frontward or rearward is activated. Sliding panels 14, which is attached by cables 68 to x-y carriage 28, opens up in proportion to the rearward travel of x-y beam 18. At the end of the completed operating cycle sliding panels 14 will close in tandem with the frontward motion of x-y beam 18. When x-y beam 18 reaches the x,y coordinates of the selected package Y motor 32 is turned off and Z motor 54 is activated. This turns Z reel 56, thereby unwinding Z cables 58, lowering picker head 52 down into freezer compartment 12. As picker head 52 enter into the predetermined cartridge 72 it is guided by the frustum-shaped lower end 55 coming in contact with cartridge walls 73. Therefore, while X motor 30 and Y motor 32 act to position picker head 52 over the cartridge 72, the frustum-shaped lower end 55 accurately positions picker head 52, compensating for misalignments in cartridge position. Similarly, the upper end 53 of picker head 52 has a uniform cross-section for a determined length sufficient to prevent tipping of picker head 52 to one side because of contact with cartridge walls 73 as it is lowered down. When any part of rubber gasket 66 contacts the package, package sensor ring 64 is activated and Z motor 54 is turned off. Blower motor 42 is turned on, sucking the package up against rubber gasket 66. Z motor 54 is then reversed, thereby winding up Z cables 58 on Z reel 56 and raising picker head 52 along with the package out of freezer compartment 12. Picker head 52 is pulled up around guide tube 48 aided by the tapered interior conical guide 63 until Z origin sensor 51 is activated and Z motor 54 is turned off.

Y motor 32 is then activated in reverse until x-y beam 18 is returned to its origin position and sliding panels 14 are simultaneously closed. Y motor 32 and blower motor 42 are deactivated thereby releasing the package, which drops down behind customer retrieval door 5. X motor 30 is reversed until x-y carriage 28 is returned to its origin position, thereby completing a full operating cycle.

Should a cartridge 72 be empty, then automatic control system 40, which monitors the descent of picker head 52 from signals received from descent measuring means (not shown), excludes the empty cartridge from the inventory, recalls picker head 52 by reversing Z motor 54, relocating picker head 52 above another cartridge 72, and continuing the procedure as detailed above. The contents of the inventory, from which a package location is determined, is stored in automatic control system 40. The data concerning which cartridges 72 correlate with which selection switches 8 is programmed by an operator during a weekly load up, for example. After the load up is completed, or after any machine shut down, the automatic control system 40 sends picker head 52 down into each and every cartridge 72 to determine, by signals sent or not sent by sensor ring 64, if it has any contents.

Figure 15:
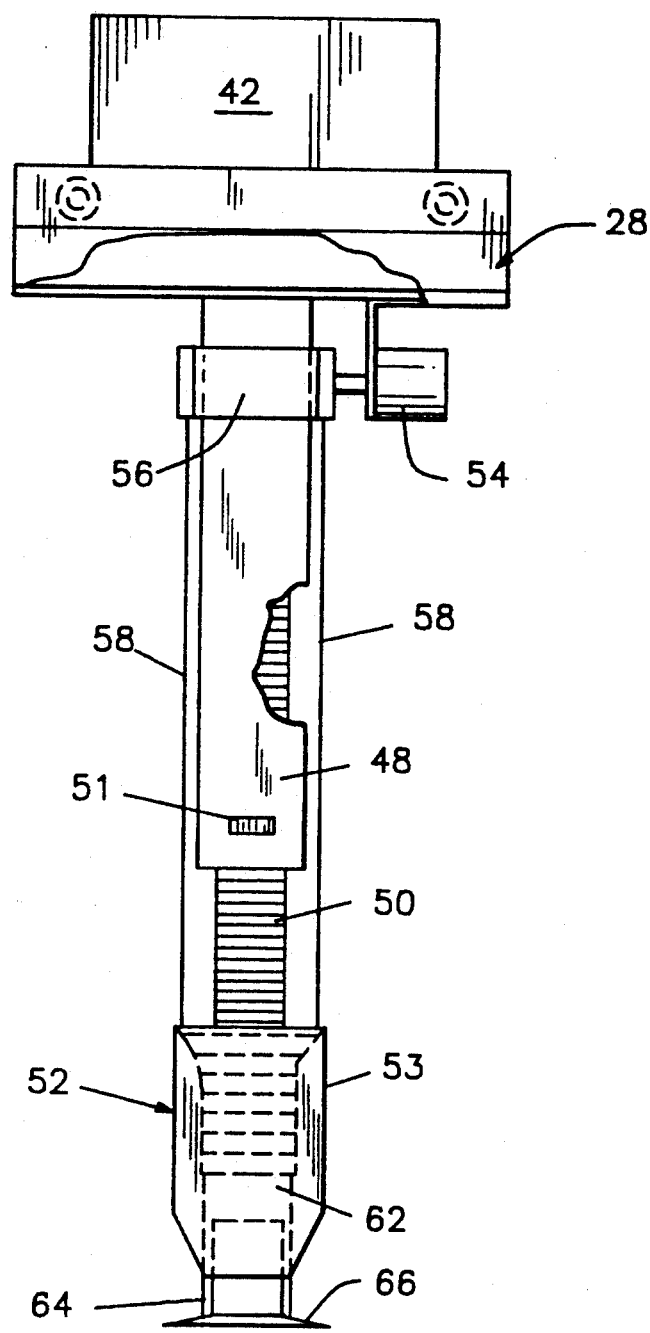
FIG. 15 is a front elevational view in detail of another embodiment of a vending apparatus for selectively dispensing one of a plurality of packages constructed in accordance with the present invention.

It will be understood that the embodiments described herein are merely exemplary and that a person skilled in the art may make many variations and modifications without departing from the spirit and scope of the invention. For example, blower motor 42 could be mounted on X-Y carriage 28, as shown in FIG. 15. All such modifications and variations are intended to be included within the scope of the invention as defined in the appended claims.

I claim:

1. A frozen confection vending apparatus for selectively dispensing one of a plurality of packages, said vending apparatus comprising:
   a) an outer cabinet;
   b) storing means for storing the plurality of packages, said storing means comprising a freezer compartment disposed within a portion of said outer cabinet, said freezer compartment having displaceable means for thermally separating the interior of said freezer compartment from the ambient air in the remainder of said outer cabinet's interior, said thermal separating means being operative to prevent heat transfer from said freezer compartment to said outer cabinet interior between package removal operating cycles;
   c) opening means for alternately activating and deactivating said thermal separating means immediately before and after, respectively, a package removal operating cycle;
   d) package removing means for selectively removing the selected package from said freezer compartment, said package removing means being separated from said freezer compartment by said thermal separating means between removal operating cycles and entering said freezer compartment for removing the selected package from said freezer compartment only during the removal operating cycles after said thermal separating means is deactivated; and
   e) controlling means for automatically controlling said package removing means and opening means in response to a customer's selection.

2. A vending apparatus in accordance with claim 1, wherein said package removing means comprises:
   a) a picker for contacting the package to be removed;
   b) x-y positioning means for horizontally positioning said picker over the package;
   c) z positioning means for selectively raising and lowering said picker above the package;
   d) constant air blower means for creating a constant negative air pressure, said air blower means being connected to said picker by an air hose; and
   e) sensing means for sensing contact between said picker and said package.

3. A vending apparatus in accordance with claim 2, wherein said opening means is driven by said x-y positioning means.

4. A vending apparatus in accordance with claim 1, further comprising automatic inventory taking means for keeping inventory of the packages.

5. A vending apparatus in accordance with claim 1, wherein said package removing means includes adjustable x-y positioning means to position said package removing means above the selected package.

6. A vending apparatus in accordance with claim 1, wherein said thermal separating means consists of at least one panel section which is slidably mounted on said storage means.

7. A vending apparatus in accordance with claim 1, wherein said thermal separating means consists of at least one panel, said panel being hingedly mounted on said storage means whereby said at least one panel describes a vertically arching motion when opened by said opening means.

8. A vending apparatus in accordance with claim 1, wherein said thermal separating means comprises at least one panel, said at least one panel being compressible in an accordion-like manner, whereby said thermal separating means is opened by the action of said opening means in compressing said at least one panel.

9. A vending apparatus in accordance with claim 1, wherein said thermal separating means comprises a plurality of rectangular plates, said plates being slidably connected to one another adjacent to their long edges such that said opening means may optionally fan out said plates to seal said storing means or compressively stack one atop the other thereby exposing the packages to said package removing means.

10. A vending apparatus in accordance with claim 1, wherein said thermal separating means consists of a flexible material.

11. A vending apparatus in accordance with claim 1, wherein said thermal separating means is visually transparent.

12. A vending apparatus in accordance with claim 1, wherein said thermal separating means is opened by motion of said removing means.

13. A vending apparatus for selectively dispensing one of a plurality of packages, said vending apparatus comprising:
   a) an outer cabinet;
   b) a thermally insulated freezer compartment for storing the plurality of packages, said freezer compartment being disposed within said outer cabinet and further having displaceable means for thermally separating the interior of said freezer compartment from the ambient air in the remainder of said outer cabinet's interior, said thermal separating means being operative to prevent heat transfer from said freezer compartment to said outer cabinet interior between package removal operating cycles;
   c) opening means for alternately activating and deactivating said thermal separating means immediately before and after, respectively, a package removal operating cycle;
   d) package removing means for selectively removing the selected package from said freezer compartment, said removing means being located outside said storing means between removal operating cycles and entering said storing means for removing one of the packages from said storing means only during the removal operating cycles; and
   e) controlling means for automatically controlling said package removing means and opening means in response to a customer's selection, said vending apparatus having no mechanical, electro-mechanical or electronic parts contained within said storing means between successive removal operations.

14. A vending apparatus for selectively dispensing one of a plurality of packages, said vending apparatus comprising:
   a) an outer cabinet;
   b) a thermally insulated freezer compartment for storing the plurality of packages, said freezer compartment being disposed within said outer cabinet and further having displaceable means for thermally separating the interior of said freezer compartment from the ambient air in the remainder of said outer cabinet's interior, said thermal separating means being operative to prevent heat transfer from said freezer compartment to said outer cabinet interior between package removal operating cycles;
   c) opening means for alternately activating and deactivating said thermal separating means immediately before and after, respectively, a package removal operating cycle;
   d) package removing means for selectively removing the selected package from said freezer compartment said selection apparatus comprising a picker with a picker head for contacting the package to be removed, x-y positioning means for positioning said picker over the stack, z positioning means for selectively raising and lowering said picker above the selected package, constant air blower means for creating a constant negative air pressure in said picker, said air blower means being connected to said picker by an air hose, and sensing means for sensing contact between said picker and the package, said removing means being located outside said storing means between removal operating cycles and entering said storing means for removing one of the packages from said storing means only during the removal operating cycles; and
   e) controlling means for automatically controlling said package removing means and opening means in response to a customer's selection, said vending apparatus having no mechanical, electro-mechanical or electronic parts contained within said storing means between successive removal operations.

15. Package removal apparatus in accordance with claim 14, wherein said picker head has a frustum-shaped lower section.

16. Package removal apparatus in accordance with claim 14, said picker head further comprising counterweight means for countering upward vertical force applied to said picker head by sudden closed-end vacuum pressure.

17. Package removal apparatus in accordance with claim 14, wherein said picker head is connected to said z positioning means by a longitudinally compressible air hose whereby said picker head is displaceable without interrupting said connection.

18. Package removal apparatus in accordance with claim 14, further comprising a gasket made from a flexible sealing material attached to said picker head for sealing air gaps between said picker and the selected package.

19. Package removal apparatus in accordance with claim 14, further comprising a cartridge for containing at least one stack of the packages, said cartridge being located inside said freezer compartment.

20. Package removal apparatus in accordance with claim 14, further comprising measuring means for measuring the vertical distance traveled by said picker head whereby said controlling means can determine when no more packages remain in said stack.

21. Package removal apparatus in accordance with claim 14, wherein said opening means is driven by said x-y positioning means.

22. Package removal apparatus in accordance with claim 14, further comprising at least one containment cartridge for containing the packages, said containment cartridge being located inside said freezer compartment, said containment cartridge having a chamber with inner dimensions at least as large as the maximum cross-sectional dimension of said picker.

23. Package removal apparatus in accordance with claim 22, wherein said containment cartridge is removable and has a bottom floor for supporting said packages during the loading and unloading of said cartridge into said apparatus.

24. Package removal apparatus in accordance with claim 22, further comprising removable redimensioning means for redimensioning said chamber.

* * * * *

(12) REEXAMINATION CERTIFICATE (4731st)
United States Patent
Chirnomas

(10) Number: US 5,240,139 C1
(45) Certificate Issued: Feb. 11, 2003

(54) PACKAGE VENDING MACHINE

(75) Inventor: Munroe Chirnomas, 336 Second St., Dunellen, NJ (US) 08812

(73) Assignee: Munroe Chirnomas, Dunellen, NJ (US)

Reexamination Request:
No. 90/005,824, Sep. 25, 2000

Reexamination Certificate for:
Patent No.: 5,240,139
Issued: Aug. 31, 1993
Appl. No.: 07/846,691
Filed: Mar. 6, 1992

(51) Int. Cl.$^7$ .............................................. G07F 11/00
(52) U.S. Cl. .................... 221/2; 221/123; 221/150 R; 221/155; 221/197; 221/211; 221/262
(58) Field of Search ................................. 414/797; 221/2, 221/4, 123, 150 R, 155, 197, 210, 211, 262, DIG. 1

(56) References Cited

FOREIGN PATENT DOCUMENTS

| | | |
|---|---|---|
| DE | 2455673 | 7/1998 |
| FR | 2597239 | 4/1986 |

*Primary Examiner*—H. Grant Skaggs

(57) ABSTRACT

The present invention relates to a vending apparatus for selectively dispensing one of a plurality of packages. The vending apparatus comprises:

a) an outer cabinet;

b) an isolated freezer compartment within the outer cabinet for storing the plurality of packages disposed within the outer cabinet, the freezer compartment having a thermal barrier for maintaining a frozen environment within the freezer compartment in isolation of the ambient temperature air filling the remaining interior space of the outer cabinet;

c) a mechanism for opening the thermal barrier;

d) a picker for selectively removing the selected package from the freezer compartment, the picker being located outside the freezer compartment in between operating cycles and entering the freezer compartment for removing one of the packages only during the removal operation; and e) a controller for automatically controlling the picker and opening mechanism in response to a customer's selection.

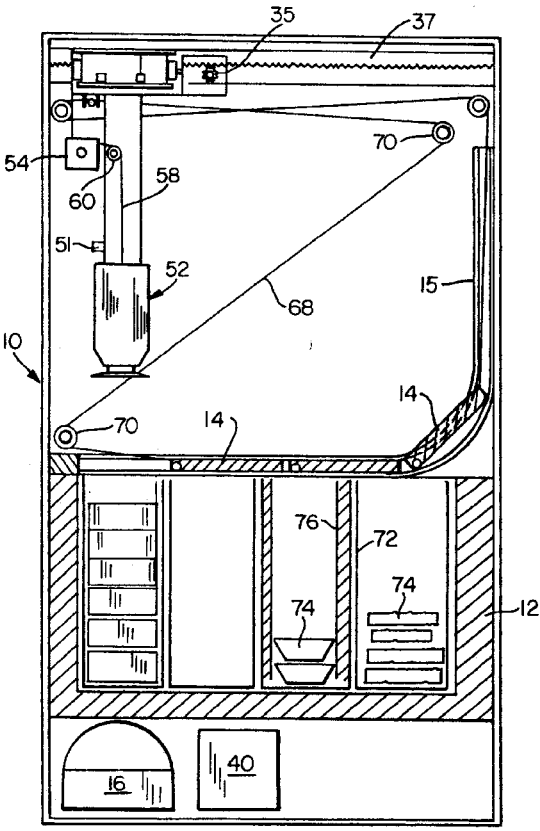

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 13, and 14 are determined to be patentable as amended.

Claims 2–12 and 15–24, dependent on an amended claim, are determined to be patentable.

New claims 25–178 are added and determined to be patentable.

1. A frozen confection vending apparatus for selectively dispensing one of a plurality of packages, said vending apparatus comprising:
   a) an outer cabinet;
   b) storing means for storing the plurality of packages, said storing means comprising a freezer compartment disposed within a portion of said outer cabinet, said freezer compartment having *a* displaceable *thermal separating* means for thermally separating the interior of said freezer compartment from the ambient air in the remainder of said outer cabinet's interior, said thermal separating means being operative to prevent heat transfer from said freezer compartment to said outer cabinet interior between package removal operating cycles;
   c) opening means for alternately activating and deactivating *displacement of* said thermal separating means immediately before and after, respectively, a package removal operating cycle;
   d) package removing means for selectively removing the selected package from said freezer compartment, said package removing means being separated from said freezer compartment by said thermal separating means between removal operating cycles and entering said freezer compartment for removing the selected package from said freezer compartment only during the removal operating cycles *after said thermal separating means is deactivated*; and
   e) controlling means for automatically controlling said package removing means and opening means in response to a customer's selection.

13. A vending apparatus for selectively dispensing one of a plurality of packages, said vending apparatus comprising:
    a) an outer cabinet;
    b) a thermally insulated freezer compartment for storing the plurality of packages, said freezer compartment being disposed within said outer cabinet and further having displaceable *thermal separating* means for thermally separating the interior of said freezer compartment from the ambient air in the remainder of said outer cabinet's interior, said thermal separating means being operative to prevent heat transfer from said freezer compartment to said outer cabinet interior between package removal operating cycles;
    c) opening means for alternately activating and deactivating *displacement of* said thermal separating means immediately before and after, respectively, a package removal operating cycle;
    d) package removing means for selectively removing the selected package from said freezer compartment, said removing means being located outside said storing means between removal operating cycles and entering said storing means for removing one of the packages from said storing means only during the removal operating cycles; and
    e) controlling means for automatically controlling said package removing means and opening means in response to a customer's selection, said vending apparatus having no mechanical, electro-mechanical or electronic parts contained within said storing means between successive removal operations.

14. A vending apparatus for selectively dispensing one of a plurality of packages, said vending apparatus comprising:
    a) an outer cabinet;
    b) a thermally insulated freezer compartment for storing the plurality of packages, said freezer compartment being disposed within said outer cabinet and further having displaceable *thermal separating* means for thermally separating the interior of said freezer compartment from the ambient air in the remainder of said outer cabinet's interior, said thermal separating means being operative to prevent heat transfer from said freezer compartment to said outer cabinet interior between package removal operating cycles;
    c) opening means for alternately activating and deactivating *displacement of* said thermal separating means immediately before and after, respectively, a package removal operating cycle;
    d) package removing means for selectively removing the selected package from said freezer compartment said selection apparatus comprising a picker with a picker head for contacting the package to be removed, x-y positioning means for positioning said picker over the stack, z positioning means for selectively raising and lowering said picker above the selected package, [constant] air blower means for creating a constant negative air pressure in said picker, said air blower means being connected to said picker by an air hose, and sensing means for sensing contact between said picker and the package, said removing means being located outside said storing means between removal operating cycles and entering said storing means for removing one of the packages from said storing means only during the removal operating cycles; and
    e) controlling means for automatically controlling said package removing means and opening means in response to a customer's selection, said vending apparatus having no mechanical, electro-mechanical or electronic parts contained within said storing means between successive removal operations.

25. *A vending apparatus for selectively dispensing one of a plurality of packages, said vending apparatus comprising:*
    a) *an outer cabinet;*
    b) *a thermally insulated freezer compartment for storing the plurality of packages, said freezer compartment being disposed within said outer cabinet and further having displaceable thermal separating means for thermally separating the interior of said freezer compartment from the ambient air in the remainder of said outer cabinet's interior, said thermal separating means* being operative to prevent heat transfer from said freezer compartment to said outer cabinet interior between package removal operating cycles;

c) opening means for alternately activating and deactivating displacement of said thermal separating means immediately before and after, respectively, a package removal operating cycle;

d) package removing means for selectively removing the selected package from said freezer compartment, said removing means being located outside said storing means between removal operating cycles and entering said storing means for removing one of the packages from said storing means only during the removal operating cycles; and e) controlling means for automatically controlling said package removing means and opening means in response to a customer's selection, said vending apparatus having no mechanical, electro-mechanical or electronic parts contained within said storing means between successive removal operations;

f) further including a package securing force generator for generating a package securing force that is provided to said package removing means to assist said package removing means to secure to and remove the selected package, said package securing force generator being disposed and remaining outside the freezer compartment at all times.

26. A vending apparatus in accordance with claim 25, wherein said package securing force generator generates a negative air pressure as said package securing force.

27. A vending apparatus in accordance with claim 26, wherein said package securing force generator includes a suction generator.

28. A vending apparatus in accordance with claim 27, wherein said suction generator includes a blower motor.

29. A vending apparatus in accordance with claim 25, wherein said package removing means includes:

a picker for contacting the package to be removed; and x-y positioning means for horizontally positioning said picker over package.

30. A vending apparatus in accordance with claim 29, wherein said package removing means includes:

sensing means for sensing contact between said picker and said package.

31. A vending apparatus in accordance with claim 29, wherein said package removing means includes:

z positioning means for slectively raising and lowering said picker above the package.

32. A vending apparatus in accordance with claim 31, wherein said package securing force generator includes:

air blower means for creating a negative air pressure, said air blower means being connected to said picker by an air hose.

33. A vending apparatus in accordance with claim 32, wherein said z positioning means includes said air hose.

34. A vending apparatus for selectively dispensing one of a plurality of packages, said vending apparatus comprising:

a) an outer cabinet;

b) a thermally insulated freezer compartment for storing the plurality of packages, said freezer compartment being disposed within said outer cabinet and further having displaceable thermal separating means for thermally separating the interior of said freezer compartment from the ambient air in the remainder of said outer cabinet's interior, said thermal separating means being operative to prevent heat transfer from said freezer compartment to said outer cabinet interior between package removal operating cycles;

c) opening means for alternately activating and deactivating displacement of said thermal separating means immediately before and after, respectively, a package removal operating cycle;

d) package removing means for selectively removing the selected package from said freezer compartment, said removing means being located outside said storing means between removal operating cycles and entering said storing means for removing one of the packages from said storing means only during the removal operating cycles; and e) controlling means for automatically controlling said package removing means and opening means in response to a customer's selection, said vending apparatus having no mechanical, electro-mechanical or electronic parts contained within said storing means between successive removal operations;

f) further including at least one package removing means driving device for moving said package removing means relative to said freezer compartment, wherein all package removing means driving devices, including said at least one package removing means driving device, are disposed and remain outside said freezer compartment at all times.

35. A vending apparatus in accordance with claim 34, wherein:

said package removing means includes a picker for contacting the package to be removed; and said plurality of driving devices includes x-y positioning means for horizontally positioning said picker over the package.

36. A vending apparatus in accordance with claim 35, wherein said package removing means includes:

sensing means for sensing contact between said picker and said package.

37. A vending apparatus in accordance with claim 35, wherein said plurality of driving devices include z positioning means for selectively raising and lowering said picker above the package.

38. A vending apparatus in accordance with claim 37, further including:

air blower means for creating a negative air pressure, said air blower means being connected to said picker by an air hose.

39. A vending apparatus in accordance with claim 38, wherein said z positioning means includes said air hose.

40. A vending apparatus for selectively dispensing one of a plurality of packages, said vending apparatus comprising:

a) an outer cabinet;

b) a thermally insulated freezer compartment for storing the plurality of packages, said freezer compartment being disposed within said outer cabinet and further having displaceable thermal separating means for thermally separating the interior of said freezer compartment from the ambient air in the remainder of said outer cabinet's interior, said thermal separating means being operative to prevent heat transfer from said freezer compartment to said outer cabinet interior between package removal operating cycles;

c) opening means for alternately activating and deactivating displacement of said thermal separating means immediately before and after, respectively, a package removal operating cycle;

d) package removing means for selectively removing the selected package from said freezer compartment, said removing means being located outside said storing means between removal operating cycles and entering said storing means for removing one of the packages from said storing means only during the removal operating cycles; and e) controlling means for automatically controlling said package removing means and opening means in response to a customer's selection, said vending apparatus having no mechanical, electro-mechanical or electronic parts contained within said storing means between successive removal operations;

f) further including at least one package removing means driving device for moving said package removing means relative to said freezer compartment;

wherein during said removal operating cycles, said package removing means is driven by said at least one package removing means driving device so that said package removing means moves within said freezer compartment at all times in substantially only one directional axis.

41. A vending apparatus in accordance with claim 40, wherein:

said package removing means includes a picker for contacting the package to be removed; and said plurality of driving devices includes x-y positioning means for horizontally positioning said picker over the package.

42. A vending apparatus in accordance with claim 41, wherein said package removing means includes:

sensing means for sensing contact between said picker and said package.

43. A vending apparatus in accordance with claim 41, wherein said plurality of driving devices include z positioning means for selectively raising and lowering said picker above the package.

44. A vending apparatus in accordance with claim 43, further including:

air blower means for creating a negative air pressure, said air blower means being connected to said picker by an air hose.

45. A vending apparatus in accordance with claim 44, wherein said z positioning means includes said air hose.

46. A vending apparatus for selectively dispensing one of a plurality of packages, said vending apparatus comprising:

a) an outer cabinet;

b) a thermally insulated freezer compartment for storing the plurality of packages, said freezer compartment being disposed within said outer cabinet, said freezer compartment having an opening on a top portion thereof for providing access from above said freezer compartment into the interior of said freezer compartment, and having a displaceable thermal separating means for thermally separating the interior of said freezer compartment from the ambient air in the remainder of said outer cabinet's interior, said thermal separating means being operative to prevent heat transfer from said freezer compartment to said outer cabinet interior between package removal operating cycles;

c) opening means for alternately activating and deactivating displacement of said thermal separating means immediately before and after, respectively, a package removal operating cycle;

d) package removing means for selectively removing the selected package from said freezer compartment, said removing means being located outside said storing means between removal operating cycles and entering said storing means for removing one of the packages from said storing means only during the removal operating cycles; and e) controlling means for automatically controlling said package removing means and opening means in response to a customer's selection, said vending apparatus having no mechanical, electro-mechanical or electronic parts contained within said storing means between successive removal operations;

f) further including at least one package removing means driving device for moving said package removing means relative to said freezer compartment, said controlling means automatically controlling said at least one package removing means driving device so that said package removing means enters said freezer compartment through said opening on the top portion thereof for removing the selected package.

47. A vending apparatus in accordance with claim 46, wherein said package removing means includes:

a picker for contacting the package to be removed; and x-y positioning means for horizontally positioning said picker over the opening at the top portion of said freezer compartment so as to be aligned with the package.

48. A vending apparatus in accordance with claim 47, wherein said package removing means includes:

sensing means for sensing contact between said picker and said package.

49. A vending apparatus in accordance with claim 47, wherein said package removing means includes:

z positioning means for selectively raising and lowering said picker above the package.

50. A vending apparatus in accordance with claim 49, further including:

air blower means for creating a negative air pressure, said air blower means being connected to said picker by an air hose.

51. A vending apparatus in accordance with claim 50, wherein said z positioning means includes said air hose.

52. A vending apparatus in accordance with claim 25, wherein said opening means comprises at least a portion of the package removing means.

53. A vending apparatus in accordance with claim 52, wherein said portion of the package removing means comprises a linkage mechanism coupled to said thermal separating means for causing said displacement of said thermal separating means.

54. A vending apparatus in accordance with claim 53, wherein said package removing means comprises:

a picker head for contacting and being secured to said selected package, a mechanical positioner, including at least one driving device, for positioning said picker head so as to be aligned with a selected storage axis of said selected package, and a further mechanical positioner, including at least a further driving device, for positioning said picker head along said selected storage axis of said selected package so that said picker head contacts said selected package.

55. A vending apparatus in accordance with claim 34, wherein said opening means comprises at least a portion of the package removing means.

56. A vending apparatus in accordance with claim 55, wherein said portion of the package removing means comprises a linkage mechanism coupled to said thermal separating means for causing said displacement of said thermal separating means.

57. A vending apparatus in accordance with claim 56, wherein said package removing means comprises:
   a picker head for contacting and being secured to said selected package,
   a mechanical positioner, including at least one driving device, for positioning said picker head so as to be aligned with a selected storage axis of said selected package, and
   a further mechanical positioner, including at least a further driving device, for positioning said picker head along said selected storage axis of said selected package so that said picker head contacts said selected package.

58. A vending apparatus in accordance with claim 40, wherein said opening means comprises at least a portion of the package removing means.

59. A vending apparatus in accordance with claim 58, wherein said portion of the package removing means comprises a linkage mechanism coupled to said thermal separating means for causing said displacement of said thermal separating means.

60. A vending apparatus in accordance with claim 59, wherein said package removing means comprises:
   a picker head for contacting and being secured to said selected package,
   a mechanical positioner, including at least one driving device, for positioning said picker head so as to be aligned with a selected storage axis of said selected package, and
   a further mechanical positioner, including at least a further driving device, for positioning said picker head along said selected storage axis of said selected package so that said picker head contacts said selected package.

61. A vending apparatus in accordance with claim 46, wherein said opening means comprises at least a portion of the package removing means.

62. A vending apparatus in accordance with claim 61, wherein said portion of the package removing means comprises a linkage mechanism coupled to said thermal separating means for causing said displacement of said thermal separating means.

63. A vending apparatus in accordance with claim 62, wherein said package removing means comprises:
   a picker head for contacting and being secured to said selected package,
   a mechanical positioner, including at least one driving device, for positioning said picker head so as to be aligned with a selected storage axis of said selected package, and
   a further mechanical positioner, including at least a further driving device, for positioning said picker head along said selected storage axis of said selected package so that said picker head contacts said selected package.

64. A vending apparatus for selectively dispensing one of a plurality of packages, said vending apparatus comprising:
   a) an outer cabinet;
   b) a thermally insulated freezer compartment for storing the plurality of packages, said freezer compartment being disposed within said outer cabinet and further having displaceable thermal separating means for thermally separating the interior of said freezer compartment from the ambient air in the remainder of said outer cabinet's interior, said thermal separating means being operative to prevent heat transfer from said freezer compartment to said outer cabinet interior between package removal operating cycles;
   c) opening means, including a linkage mechanism connected between a mechanical positioner and said thermal separating means, for alternately activating and deactivating displacement of said thermal separating means immediately before and after, respectively, a package removal operating cycle;
   d) package removing means for selectively removing the selected package from said freezer compartment, said removing means being located outside said storing means between removal operating cycles and entering said storing means for removing one of the packages from said storing means only during the removal operating cycles,
   said package removing means comprising:
      a picker head for contacting and being secured to said selected package,
      a first mechanical positioner for positioning said picker head so as to be aligned with a selected storage axis of said selected package, and
      a second mechanical positioner for positioning said picker head along said selected storage axis of said selected package so that said picker head contacts said selected package; and
   e) controlling means for automatically controlling said package removing means and opening means in response to a customer's selection, said vending apparatus having no mechanical, electro-mechanical or electronic parts contained within said storing means between successive removal operations selection;
   f) further including a package securing force generator for generating a package securing force that is provided to said package removing means to assist said picker head to secure to and remove the selected package, said package securing force generator being disposed and remaining outside the freezer compartment at all times.

65. A vending apparatus in accordance with claim 64, wherein said package securing force generator generates a negative air pressure as said package securing force.

66. A vending apparatus in accordance with claim 64, wherein said package securing force generator includes a suction generator.

67. A vending apparatus in accordance with claim 66, wherein said suction generator includes a blower motor.

68. A vending apparatus in accordance with claim 64, wherein said first mechanical positioner includes X-Y positioning drives for horizontally positioning said picker head over said package.

69. A vending apparatus in accordance with claim 64, wherein said package removing means includes a sensor for sensing contact between said picker head and said package.

70. A vending apparatus in accordance with claim 64, wherein said second mechanical positioner includes a Z positioning drive for selectively raising and lowering said picker above said package.

71. A vending apparatus in accordance with claim 64, wherein said package securing force generator includes an air blower motor for creating a negative air pressure, said air blower motor being connected to said picker head by an air hose.

72. A vending apparatus in accordance with claim 71, wherein said Z positioning drive is coupled to said air hose.

73. A vending apparatus for selectively dispensing one of a plurality of packages, said vending apparatus comprising:
   a) an outer cabinet;
   b) a thermally insulated freezer compartment for storing the plurality of packages, said freezer compartment being disposed within said outer cabinet and further having displaceable thermal separating means for thermally separating the interior of said freezer compartment from the ambient air in the remainder of said outer cabinet's interior, said thermal separating means being operative to prevent heat transfer from said freezer compartment to said outer cabinet interior between package removal operating cycles;
   c) opening means, including a linkage mechanism connected between a mechanical positioner and said thermal separating means, for alternately activating and deactivating displacement of said thermal separating means immediately before and after, respectively, a package removal operating cycle;
   d) package removing means for selectively removing the selected package from said freezer compartment, said removing means being located outside said storing means between removal operating cycles and entering said storing means for removing one of the packages from said storing means only during the removal operating cycles,
   said package removing means comprising:
      a picker head for contacting and being secured to said selected package,
      a first mechanical positioner, including at least one driving device, for positioning said picker head so as to be aligned with a selected storage axis of said selected package, and
      a second mechanical positioner, including a further driving device, for positioning said picker head along said selected storage axis of said selected package so that said picker head contacts said selected package; and
   e) controlling means for automatically controlling said package removing means and opening means in response to a customer's selection, said vending apparatus having no mechanical, electro-mechanical or electronic parts contained within said storing means between successive removal operations selection;
   f) wherein said at least one and said further driving devices, are disposed and remain outside said freezer compartment at all times.

74. A vending apparatus in accordance with claim 73, wherein said first mechanical positioner includes X-Y positioning driving devices for horizontally positioning said picker head over said package.

75. A vending apparatus in accordance with claim 73, wherein said package removing means includes a sensor for sensing contact between said picker head and said package.

76. A vending apparatus in accordance with claim 73, wherein said second mechanical positioner includes a Z positioning driving device for selectively raising and lowering said picker head above the package.

77. A vending apparatus in accordance with claim 73, wherein said package removing means includes an air blower motor for creating a negative air pressure, said air blower motor being connected to said picker head by an air hose.

78. A vending apparatus in accordance with claim 74, wherein said Z positioning driving device is coupled to said air hose.

79. A vending apparatus for selectively dispensing one of a plurality of packages, said vending apparatus comprising:
   a) an outer cabinet;
   b) a thermally insulated freezer compartment for storing the plurality of packages, said freezer compartment being disposed within said outer cabinet and further having displaceable thermal separating means for thermally separating the interior of said freezer compartment from the ambient air in the remainder of said outer cabinet's interior, said thermal separating means being operative to prevent heat transfer from said freezer compartment to said outer cabinet interior between package removal operating cycles;
   c) opening means, including a linkage mechanism connected between a mechanical positioner and said thermal separating means, for alternately activating and deactivating displacement of said thermal separating means immediately before and after, respectively, a package removal operating cycle;
   d) package removing means for selectively removing the selected package from said freezer compartment, said removing means being located outside said storing means between removal operating cycles and entering said storing means for removing one of the packages from said storing means only during the removal operating cycles,
   said package removing means comprising:
      a picker head for contacting and being secured to said selected package,
      a first mechanical positioner for positioning said picker head so as to be aligned with a selected storage axis of said selected package, and
      a second mechanical positioner for positioning said picker head along said selected storage axis of said selected package so that said picker head contacts said selected package; and
   e) controlling means for automatically controlling said package removing means and opening means in response to a customer's selection, said vending apparatus having no mechanical, electro-mechanical or electronic parts contained within said storing means between successive removal operations selection;
   f) wherein during said removal operating cycles, said first and second mechanical positioners position said picker head so that it enters into said freezer compartment, and at all times moves therein, in substantially only one selected storage axis.

80. A vending apparatus in accordance with claim 79, wherein said first mechanical positioner includes X-Y positioning driving devices for horizontally positioning said picker head over said package.

81. A vending apparatus in accordance with claim 79, wherein said package removing means includes a sensor for sensing contact between said picker head and said package.

82. A vending apparatus in accordance with claim 79, wherein said second mechanical positioner includes a Z positioning driving device for selectively raising and lowering said picker head above the package.

83. A vending apparatus in accordance with claim 82, wherein said package removing means includes an air blower motor for creating a negative air pressure, said air blower motor being connected to said picker head by an air hose.

84. A vending apparatus in accordance with claim 83, wherein said Z positioning driving device is coupled to said air hose.

85. A vending apparatus for selectively dispensing one of a plurality of packages, said vending apparatus comprising:
   a) an outer cabinet;
   b) a thermally insulated freezer compartment for storing the plurality of packages, said freezer compartment being disposed within said outer cabinet, said freezer compartment having an opening on a top portion thereof for providing access from above said freezer compartment into the interior of said freezer compartment, and having a displaceable thermal separating means for thermally separating the interior of said freezer compartment from the ambient air in the remainder of said outer cabinet's interior, said thermal separating means being operative to prevent heat transfer from said freezer compartment to said outer cabinet interior between package removal operating cycles;
   c) opening means, including a linkage mechanism connected between a mechanical positioner and said thermal separating means, for alternately activating and deactivating displacement of said thermal separating means immediately before and after, respectively, a package removal operating cycle;
   d) package removing means for selectively removing the selected package from said freezer compartment, said removing means being located outside said storing means between removal operating cycles and entering said storing means for removing one of the packages from said storing means only during the removal operating cycles,
   said package removing means comprising:
      a picker head for contacting and being secured to said selected package,
      a first mechanical positioner for positioning said picker head so as to be aligned with a selected storage axis of said selected package, and
      a second mechanical positioner for positioning said picker head along said selected storage axis of said selected package so that said picker head contacts said selected package; and
   e) controlling means for automatically controlling said package removing means and opening means in response to a customer's selection, said vending apparatus having no mechanical, electro-mechanical or electronic parts contained within said storing means between successive removal operations;
   f) further including at least one package removing means driving device for moving said package removing means relative to said freezer compartment, said controlling means automatically controlling said at least one package removing means driving device so that said package removing means enters said freezer compartment through said opening on the top portion thereof for removing the selected package.

86. A vending apparatus in accordance with claim 85, wherein said first mechanical positioner includes X-Y positioning drives for horizontally positioning said picker head over said package.

87. A vending apparatus in accordance with claim 85, wherein said package removing means includes a sensor for sensing contact between said picker head and said package.

88. A vending apparatus in accordance with claim 85, wherein said second mechanical positioner includes a Z positioning drive for selectively raising and lowering said picker above said package.

89. A vending apparatus in accordance with claim 88, wherein said package removing means includes an air blower motor for ceating a negative air pressure, said air blower motor being connected to said picker by an air hose.

90. A vending apparatus in accordance with claim 89, wherein said Z positioning drive is coupled to said air hose.

91. A vending apparatus in accordance with claim 25 or 45, wherein said package removing means includes a free end having coupled thereto a picker head, said package securing force being used by said picker head for being secured to and removing said selected package.

92. A vending apparatus in accordance with claim 25 or 45, further comprising automatic inventory taking means for keeping inventory of the packages.

93. A vending apparatus in accordance with claim 91, wherein said package removing means includes adjustable x-y positioning means to position said picker head above the selected package.

94. A vending apparatus in accordance with claim 93, wherein said opening means is driven by said x-y positioning means.

95. A vending apparatus in accordance with claim 25 or 45, wherein said thermal separating means consists of at least one panel section which is slidably mounted on said freezer compartment.

96. A vending apparatus in accordance with claim 25 or 45, wherein said thermal separating means consists of at least one panel, said panel being hingedly mounted on said freezer compartment whereby said at least one panel describes a vertically arching motion when opened by said opening means.

97. A vending apparatus in accordance with claim 25 or 45, wherein said thermal separating means comprises at least one panel, said at least one panel being compressible in an accordion-like manner, whereby said thermal separating means is opened by the action of said opening means in compressing said at least one panel.

98. A vending apparatus in accordance with claim 25 or 45, wherein said thermal separating means comprises a plurality of rectangular plates, said plates being slidably connected to one another adjacent to their long edges such that said opening means may optionally fan out said plates to seal said freezer compartment or compressively stack one atop the other thereby exposing the packages to said package removing means.

99. A vending apparatus in accordance with claim 25 or 45, wherein said thermal separating means consists of a flexible material.

100. A vending apparatus in accordance with claim 25 or 45, wherein said thermal separating means is visually transparent.

101. A vending apparatus in accordance with claim 25 or 45, wherein said package removing means includes a positioninig mechanism for controllably positioning said picker head, and said thermal separating means is selectively operated by motion of said positioning mechanism.

102. A vending apparatus in accordance with claim 89, wherein said picker head has a frustrum-shaped lower section.

103. A vending apparatus in accordance with claim 89, said picker head further comprising counterweight means for countering upward vertical force applied to said picker head by sudden closed-end vacuum pressure.

104. A vending apparatus in accordance with claim 101, wherein said positioning means includes a Z positioning means for selectively raising and lowering said picker head above the package.

105. A vending apparatus in accordance with claim 104, wherein said picker head is connected to said Z positioning means by a longitudinally compressible air hose whereby said picker head is displaceable without interrupting said connection.

106. A vending apparatus in accordance with claim 89, further comprising a gasket made from a flexible sealing material attached to said picker head for sealing air gaps between said picker and the selected package.

107. A vending apparatus in accordance with claim 89, further comprising a cartridge for containing at least one stack of the packages, said cartridge being located inside said freezer compartment.

108. A vending apparatus in accordance with claim 89, further comprising measuring means for measuring the vertical distance traveled by said picker head whereby said controlling means can determine when no more packages remain in said stack.

109. A vending apparatus in accordance with claim 89, further comprising at least one containment cartridge for containing the packages, said containment cartridge being located inside said freezer compartment, said containment cartridge having a chamber with inner dimensions at least as large as the maximum cross-sectional dimension of said picker head.

110. A vending apparatus in accordance with claim 109, wherein said containment cartridge is removable and has a bottom floor for supporting said packages during the loading and unloading of said cartridge into said apparatus.

111. A vending apparatus in accordance with claim 109, further comprising removable redimensioning means for redimensioning said chamber.

112. A frozen confection vending apparatus for selectively dispensing one of a plurality of packages, said vending apparatus comprising:

a) an outer cabinet;

b) storing means for storing the plurality of packages, said storing means comprising a freezer compartment disposed within a portion of said outer cabinet, said freezer compartment having a displaceable thermal separating means for thermally separating the interior of said freezer compartment from the ambient air in the remainder of said outer cabinet's interior, said thermal separating means being operative to prevent heat transfer from said freezer compartment to said outer cabinet interior between package removal operating cycles;

c) opening means for alternately activating and deactivating displacement of said thermal separating means immediately before and after, respectively, a package removal operating cycle;

d) package removing means for selectively removing the selected package from said freezer compartment, said package removing means being separated from said freezer compartment by said thermal separating means between removal operating cycles and entering said freezer compartment for removing the selected package from said freezer compartment only during the removal operating cycles after said thermal separating means is deactivated; and e) controlling means for automatically controlling said package removing means and opening means in response to a customer's selection;

f) further including a package securing force generator for generating a package securing force that is provided to said package removing means to assist said package removing means to secure to and remove the selected package, said package securing force generator being disposed and remaining outside the freezer compartment at all times.

113. A vending apparatus in accordance with claim 112, wherein said package securing force generator generates a negative air pressure as said package securing force.

114. A vending apparatus in accordance with claim 113, wherein said package securing force generator includes a suction generator.

115. A vending apparatus in accordance with claim 114, wherein said suction generator includes a blower motor.

116. A vending apparatus in accordance with claim 112, wherein said package removing means includes:

a picker for contacting the package to be removed; and x-y positioning means for horizontally positioning said picker over package.

117. A vending apparatus in accordance with claim 116, wherein said package removing means includes:

sensing means for sensing contact between said picker and said package.

118. A vending apparatus in accordance with claim 116, wherein said package removing means includes:

z positioning means for selectively raising and lowering said picker above the package.

119. A vending apparatus in accordance with claim 118, wherein said package securing force generator includes:

air blower means for creating a negative air pressure, said air blower means being connected to said picker by an air hose.

120. A vending apparatus in accordance with claim 119, wherein said z positioning means includes said air hose.

121. A frozen confection vending apparatus for selectively dispensing one of a plurality of packages, said vending apparatus comprising:

a) an outer cabinet;

b) storing means for storing the plurality of packages, said storing means comprising a freezer compartment disposed within a portion of said outer cabinet, said freezer compartment having a displaceable thermal separating means for thermally separating the interior of said freezer compartment from the ambient air in the remainder of said outer cabinet's interior, said thermal separating means being operative to prevent heat transfer from said freezer compartment to said outer cabinet interior between package removal operating cycles;

c) opening means for alternately activating and deactivating displacement of said thermal separating means immediately before and after, respectively, a package removal operating cycle;

d) package removing means for selectively removing the selected package from said freezer compartment, said package removing means being separated from said freezer compartment by said thermal separating means between removal operating cycles and entering said freezer compartment for removing the selected package from said freezer compartment only during the removal operating cycles after said thermal separating means is deactivated; and e) controlling means for automatically controlling said package removing means and opening means in response to a customer's selection;

f) further including at least one package removing means driving device for moving said package removing means relative to said freezer compartment, wherein all package removing means driving devices, including said at least one package removing means driving device, are disposed and remain outside said freezer compartment at all times.

122. A vending apparatus in accordance with claim 121, wherein:

said package removing means includes a picker for contacting the package to be removed; and said plurality of driving devices includes x-y positioning means for horizontally positioning said picker over the package.

123. A vending apparatus in accordance with claim 122, wherein said package removing means includes:

sensing means for sensing contact between said picker and said package.

124. A vending apparatus in accordance with claim 122, wherein said plurality of driving devices include z positioning means for selectively raising and lowering said picker above the package.

125. A vending apparatus in accordance with claim 124, further including:

air blower means for creating a negative air pressure, said air blower means being connected to said picker by an air hose.

126. A vending apparatus in accordance with claim 125, wherein said z positioning means includes said air hose.

127. A frozen confection vending apparatus for selectively dispensing one of a plurality of packages, said vending apparatus comprising:

a) an outer cabinet;

b) storing means for storing the plurality of packages, said storing means comprising a freezer compartment disposed within a portion of said outer cabinet, said freezer compartment having a displaceable thermal separating means for thermally separating the interior of said freezer compartment from the ambient air in the remainder of said outer cabinet's interior, said thermal separating means being operative to prevent heat transfer from said freezer compartment to said outer cabinet interior between package removal operating cycles;

c) opening means for alternately activating and deactivating displacement of said thermal separating means immediately before and after, respectively, a package removal operating cycle;

d) package removing means for selectively removing the selected package from said freezer compartment, said package removing means being separated from said freezer compartment by said thermal separating means between removal operating cycles and entering said freezer compartment for removing the selected package from said freezer compartment only during the removal operating cycles after said thermal separating means is deactivated; and e) controlling means for automatically controlling said package removing means and opening means in response to a customer's selection;

f) further including at least one package removing means driving device for moving said package removing means relative to said freezer compartment;

wherein during said removal operating cycles, said package removing means is driven by said at least one package removing means driving device so that said package removing means moves within said freezer compartment at all times in substantially only one directional axis.

128. A vending apparatus in accordance with claim 127, wherein:

said package removing means includes a picker for contacting the package to be removed; and said plurality of driving devices includes x-y positioning means for horizontally positioning said picker over the package.

129. A vending apparatus in accordance with claim 128, wherein said package removing means includes:

sensing means for sensing contact between said picker and said package.

130. A vending apparatus in accordance with claim 128, wherein said plurality of driving devices include z positioning means for selectively raising and lowering said picker above the package.

131. A vending apparatus in accordance with claim 130, further including:

air blower means for creating a negative air pressure, said air blower means being connected to said picker by an air hose.

132. A vending apparatus in accordance with claim 131, wherein said z positioning means includes said air hose.

133. A frozen confection vending apparatus for selectively dispensing one of a plurality of packages, said vending apparatus comprising:

a) an outer cabinet;

b) storing means for storing the plurality of packages, said storing means comprising a thermally insulated freezer compartment, said freezer compartment being disposed within said outer cabinet, said freezer compartment having an opening on a top portion thereof for providing access from above said freezer compartment into the interior of said freezer compartment, and having a displaceable thermal separating means for thermally separating the interior of said freezer compartment from the ambient air in the remainder of said outer cabinet's interior, said thermal separating means being operative to prevent heat transfer from said freezer compartment to said outer cabinet interior between package removal operating cycles;

c) opening means for alternately activating and deactivating displacement of said thermal separating means immediately before and after, respectively, a package removal operating cycle;

d) package removing means for selectively removing the selected package from said freezer compartment, said package removing means being separated from said freezer compartment by said thermal separating means between removal operating cycles and entering said freezer compartment for removing the selected package from said freezer compartment only during the removal operating cycles after said thermal separating means is deactivated; and e) controlling means for automatically controlling said package removing means and opening means in response to a customer's selection;

f) further including at least one package removing means driving device for moving said package removing means relative to said freezer compartment, said controlling means automatically controlling said at least one package removing means driving device so that said package removing means enters said freezer compartment through said opening on the top portion thereof for removing the selected package.

134. A vending apparatus in accordance with claim 133, wherein said package removing means includes:

a picker for contacting the package to be removed; and x-y positioning means for horizontally positioning said picker over the opening at the top portion of said freezer compartment so as to be aligned with the package.

135. A vending apparatus in accordance with claim 134, wherein said package removing means includes:

sensing means for sensing contact between said picker and said package.

136. A vending apparatus in accordance with claim 134, wherein said package removing means includes:

z positioning means for selectively raising and lowering said picker above the package.

137. A vending apparatus in accordance with claim 136, further including:

air blower means for creating a negative air pressure, said air blower means being connected to said picker by an air hose.

138. A vending apparatus in accordance with claim 137, wherein said z positioning means includes said air hose.

139. A frozen confection vending apparatus for selectively dispensing one of a plurality of packages, said vending apparatus comprising:

a) an outer cabinet;

b) storing means for storing the plurality of packages, said storing means comprising a freezer compartment disposed within a portion of said outer cabinet, said freezer compartment having a displaceable thermal separating means for thermally separating the interior of said freezer compartment from the ambient air in the remainder of said outer cabinet's interior, said thermal separating means being operative to prevent heat transfer from said freezer compartment to said outer cabinet interior between package removal operating cycles;

c) opening means, including a linkage mechanism connected between a mechanical positioner and said thermal separating means, for alternately activating and deactivating displacement of said thermal separating means immediately before and after, respectively, a package removal operating cycle;

d) package removing means for selectively removing the selected package from said freezer compartment, said package removing means being separated from said freezer compartment by said thermal separating means between removal operating cycles and entering said freezer compartment for removing the selected package from said freezer compartment only during the removal operating cycles after said thermal separating means is deactivated, said package removing means comprising:
a picker head for contacting and being secured to said selected package,
a first mechanical positioner for positioning said picker head so as to be aligned with a selected storage axis of said selected package, and
a second mechanical positioner for positioning said picker head along said selected storage axis of said selected package so that said picker head contacts said selected package; and e) controlling means for automatically controlling said package removing means and opening means in response to a customer's selection;

f) further including a package securing force generator for generating a package securing force that is provided to said package removing means to assist said package removing means to secure to and remove the selected package, said package securing force generator being disposed and remaining outside the freezer compartment at all times.

140. A vending apparatus in accordance with claim 139, wherein said package securing force generator generates a negative air pressure as said package securing force.

141. A vending apparatus in accordance with claim 139, wherein said package securing force generator includes a suction generator.

142. A vending apparatus in accordance with claim 141, wherein said suction generator includes a blower motor.

143. A vending apparatus in accordance with claim 139, wherein said first mechanical positioner includes X-Y positioning drives for horizontally positioning said picker head over said package.

144. A vending apparatus in accordance with claim 139, wherein said package removing means includes a sensor for sensing contact between said picker head and said package.

145. A vending apparatus in accordance with claim 139, wherein said second mechanical positioner includes a Z positioning drive for selectively raising and lowering said picker above said pacakge.

146. A vending apparatus in accordance with claim 139, wherein said package securing force generator includes an air blower motor for creating a negative air pressure, said air blower motor being connected to said picker head by an air hose.

147. A vending apparatus in accordance with claim 146, wherein said Z positioning drive is coupled to said air hose.

148. A frozen confection vending apparatus for selectively dispensing one of a plurality of packages, said vending apparatus comprising:

a) an outer cabinet;

b) storing means for storing the plurality of packages, said storing means comprising a freezer compartment disposed within a portion of said outer cabinet, said freezer compartment having a displaceable thermal separating means for thermally separating the interior of said freezer compartment from the ambient air in the remainder of said outer cabinet's interior, said thermal separating means being operative to prevent heat transfer from said freezer compartment to said outer cabinet interior between package removal operating cycles;

c) opening means, including a linkage mechanism connected between a mechanical positioner and said thermal separating means, for alternately activating and deactivating displacement of said thermal separating means immediately before and after, respectively, a package removal operating cycle;

d) package removing means for selectively removing the selected package from said freezer compartment, said package removing means being separated from said freezer compartment by said thermal separating means between removal operating cycles and entering said freezer compartment for removing the selected package from said freezer compartment only during the removal operating cycles after said thermal separating means is deactivated, said package removing means comprising:
a picker head for contacting and being secured to said selected package,
a first mechanical positioner for positioning said picker head so as to be aligned with a selected storage axis of said selected package, and a second mechanical positioner for positioning said picker head along said selected storage axis of said selected package so that said picker head contacts said selected package; and e) controlling means for automatically controlling said package removing means and opening means in response to a customer's selection;

f) further including at least one package removing means driving device for moving said package removing means relative to said freezer compartment,
wherein all package removing means driving devices, including said at least one package removing means driving device, are disposed and remain outside said freezer compartment at all times.

149. A vending apparatus in accordance with claim 148, wherein said first mechanical positioner includes X-Y positioning driving devices for horizontally positioning said picker head over said package.

150. A vending apparatus in accordance with claim 148, wherein said package removing means includes a sensor for sensing contact between said picker head and said package.

151. A vending apparatus in accordance with claim 148, wherein said second mechanical positioner includes a Z positioning driving device for selectively raising and lowering said picker head above the package.

152. A vending apparatus in accordance with claim 151, wherein said package removing means includes an air blower motor for creating a negative air pressure, said air blower motor being connected to said picker head by an air hose.

153. A vending apparatus in accordance with claim 152, wherein said Z positioning driving device is coupled to said air hose.

154. A frozen confection vending apparatus for selectively dispensing one of a plurality of packages, said vending apparatus comprising:

a) an outer cabinet;

b) storing means for storing the plurality of packages, said storing means comprising a freezer compartment disposed within a portion of said outer cabinet, said freezer compartment having a displaceable thermal separating means for thermally separating the interior of said freezer compartment from the ambient air in the remainder of said outer cabinet's interior, said thermal separating means being operative to prevent heat transfer from said freezer compartment to said outer cabinet interior between package removal operating cycles;

c) opening means, including a linkage mechanism connected between a mechanical positioner and said thermal separating means, for alternately activating and deactivating displacement of said thermal separating means immediately before and after, respectively, a package removal operating cycle;

d) package removing means for selectively removing the selected package from said freezer compartment, said package removing means being separated from said freezer compartment by said thermal separating means between removal operating cycles and entering said freezer compartment for removing the selected package from said freezer compartment only during the removal operating cycles after said thermal separating means is deactivated,
said package removing means comprising:
a picker head for contacting and being secured to said selected package, a first mechanical positioner for positioning said picker head so as to be aligned with a selected storage axis of said selected package, and a second mechanical positioner for positioning said picker head along said selected storage axis of said selected package so that said picker head contacts said selected package; and e) controlling means for automatically controlling said package removing means and opening means in response to a customer's selection;

f) further including at least one package removing means driving device for moving said package removing means relative to said freezer compartment;
wherein during said removal operating cycles, said package removing means is driven by said at least one package removing means driving device so that said package removing means moves within said freezer compartment at all times in substantially only one directional axis.

155. A vending apparatus in accordance with claim 154, wherein said first mechanical positioner includes X-Y positioning driving devices for horizontally positioning said picker head over said package.

156. A vending apparatus in accordance with claim 154, wherein said package removing means includes a sensor for sensing contact between said picker head and said package.

157. A vending apparatus in accordance with claim 154, wherein said second mechanical positioner includes a Z positioning driving device for selectively raising and lowering said picker head above the package.

158. A vending apparatus in accordance with claim 157, wherein said package removing means includes an air blower motor for creating a negative air pressure, said air blower motor being connected to said picker head by an air hose.

159. A vending apparatus in accordance with claim 158, wherein said Z positioning driving device is coupled to said air hose.

160. A frozen confection vending apparatus for selectively dispensing one of a plurality of packages, said vending apparatus comprising:

a) an outer cabinet;

b) storing means for storing the plurality of packages, said storing means comprising a thermally insulated freezer compartment, said freezer compartment being disposed within said outer cabinet, said freezer compartment having an opening on a top portion therof for providing access from above said freezer compartment into the interior of said freezer compartment, and having a displaceable thermal separating means for thermally separating the interior of said freezer compartment from the ambient air in the remainder of said outer cabinet's interior, said thermal separating means being operative to prevent heat transfer from said freezer compartment to said outer cabinet interior between package removal operating cycles;

c) opening means, including a linkage mechanism connected between a mechanical positioner and said thermal separating means, for alternately activating and deactivating displacement of said thermal separating means immediately before and after, respectively, a package removal operating cycle;

d) package removing means for selectively removing the selected package from said freezer compartment, said package removing means being separated from said freezer compartment by said thermal separating means between removal operating cycles and entering said freezer compartment for removing the selected package from said freezer compartment only during the removal operating cycles after said thermal separating means is deactivated, said package removing means comprising:
- a picker head for contacting and being secured to said selected package,
- a first mechanical positioner for positioning said picker head so as to be aligned with a selected storage axis of said selected package, and
- a second mechanical positioner for positioning said picker head along said selected storage axis of said selected package so that said picker head contacts said selected package; and e) controlling means for automatically controlling said package removing means and opening means in response to a customer's selection;

f) further including at least one package removing means driving device for moving said package removing means relative to said freezer compartment, said controlling means automatically controlling said at least one package removing means driving device so that said package removing means enters said freezer compartment through said opening on the top portion thereof for removing the selected package.

161. A vending apparatus in accordance with claim 160, wherein said first mechanical positioner includes X-Y positioning drives for horizontally positioning said picker head over said package.

162. A vending apparatus in accordance with claim 160, wherein said package removing means includes a sensor for sensing contact between said picker head and said package.

163. A vending apparatus in accordance with claim 160, wherein said second mechanical positioner includes a Z positioning drive for selectively raising and lowering said picker above said package.

164. A vending apparatus in accordance with claim 163, wherein said package removing means includes an air blower motor for creating a negative air pressure, said air blower motor being connected to said picker by an air hose.

165. A vending apparatus in accordance with claim 164, wherein said Z positioning drive is coupled to said air hose.

166. A vending apparatus in accordance with claim 25 or 64, further including at least one package removing means driving device for moving said package removing means relative to said freezer compartment, wherein all package removing means driving devices, including said at least one package removing means driving device, are disposed and remain outside said freezer compartment at all times.

167. A vending apparatus in accordance with claim 25 or 64, further including at least one package removing means driving device for moving said package removing means relative to said freezer compartment;

wherein during said removal operating cycles, said package removing means is driven by said at least one package removing means driving device so that said package removing means moves within said freezer compartment at all times in substantially only one directional axis.

168. A vending apparatus in accordance with claim 25 or 64, wherein said freezer compartment has an opening on a top portion thereof for providing access from above said freezer compartment into the interior of said freezer compartment, further including at least one package removing means driving device for moving said package removing means relative to said freezer compartment, said controlling means automatically controlling said at least one package removing means driving device so that said package removing means enters said freezer compartment through said opening on the top portion thereof for removing the selected package.

169. A vending apparatus in accordance with claim 25 or 64, further including at least one package removing means driving device for moving said package removing means relative to said freezer compartment, wherein all package removing means driving devices, including said at least one package removing means driving device, are disposed and remain outside said freezer compartment at all times, wherein during said removal operating cycles, said package removing means is driven by said at least one package removing means driving device so that said package removing means moves within said freezer compartment at all times in substantially only one directional axis, and wherein said freezer compartment has an opening on a top portion thereof for providing access from above said freezer compartment into the interior of said freezer compartment, further including at least one package removing means driving device for moving said package removing means relative to said freezer compartment, said controlling means automatically controlling said at least one package removing means driving device so that said package removing means enters said freezer compartment through said opening on the top portion thereof for removing the selected package.

170. A vending apparatus in accordance with claim 1, wherein said package removing means enters said freezer compartment after said thermal separating means is deactivated to an extent necessary to allow access to the selected article in said freezer compartment.

171. A vending apparatus in accordance with claim 112, wherein said package removing means enters said freezer compartment after said thermal separating means is deactivated to an extent necessary to allow access to the selected article in said freezer compartment.

172. A vending apparatus in accordance with claim 119, wherein said package removing means enters said freezer compartment after said thermal separating means is deactivated to an extent necessary to allow access to the selected article in said freezer compartment.

173. A vending apparatus in accordance with claim 127, wherein said package removing means enters said freezer compartment after said thermal separating means is deactivated to an extent necessary to allow access to the selected article in said freezer compartment.

174. A vending apparatus in accordance with claim 133, wherein said package removing means enters said freezer compartment after said thermal separating means is deactivated to an extent necessary to allow access to the selected article in said freezer compartment.

175. A vending apparatus in accordance with claim 139, wherein said package removing means enters said freezer compartment after said thermal separating means is deactivated to an extent necessary to allow access to the selected article in said freezer compartment.

176. A vending apparatus in accordance with claim 148, wherein said package removing means enters said freezer compartment after said thermal separating means is deactivated to an extent necessary to allow access to the selected article in said freezer compartment.

177. A vending apparatus in accordance with claim 154, wherein said package removing means enters said freezer compartment after said thermal separating means is deactivated to an extent necessary to allow access to the selected article in said freezer compartment.

178. A vending apparatus in accordance with claim 160, wherein said package removing means enters said freezer compartment after said thermal separating means is deactivated to an extent necessary to allow access to the selected article in said freezer compartment.

* * * * *